(12) United States Patent
Cho et al.

(10) Patent No.: US 8,111,351 B2
(45) Date of Patent: Feb. 7, 2012

(54) BACK LIGHT UNIT AND LIQUID CRYSTAL DISPLAY USING THE SAME

(75) Inventors: Namchul Cho, Seoul (KR); Joowon Cha, Chuncheon-si (KR)

(73) Assignee: LG Display Co., Ltd., Seoul (KR)

( * ) Notice: Subject to any disclaimer, the term of this patent is extended or adjusted under 35 U.S.C. 154(b) by 567 days.

(21) Appl. No.: 12/328,101

(22) Filed: Dec. 4, 2008

(65) Prior Publication Data

US 2010/0079699 A1    Apr. 1, 2010

(30) Foreign Application Priority Data

Sep. 26, 2008 (KR) ................ 10-2008-0094816

(51) Int. Cl.
*G02F 1/1335* (2006.01)
*G02F 1/1333* (2006.01)

(52) U.S. Cl. ................. 349/62; 349/64; 349/58

(58) Field of Classification Search .......... 349/64, 349/62

See application file for complete search history.

(56) References Cited

U.S. PATENT DOCUMENTS

| 2004/0227870 A1* | 11/2004 | Jang | 349/64 |
| 2006/0007367 A1* | 1/2006 | Cho | 349/58 |
| 2007/0109461 A1* | 5/2007 | Park | 349/58 |

\* cited by examiner

*Primary Examiner* — Wen-Ying P Chen
(74) *Attorney, Agent, or Firm* — Brinks Hofer Gilson & Lione

(57) ABSTRACT

The disclosure relates to the backlight unit for preventing the optical sheet from cracking and the liquid crystal display using the backlight unit. The backlight unit comprises a light having a plurality of light sources; a bottom cover housing the light and having a first protrusion; a support side engaging to both open ends of the bottom cover to support the light and having a second protrusion; an optical sheet disposing on the light and including a first hook having a first elliptical hole for inserting the first protrusion and a second hook having a second elliptical hole for inserting the second protrusion; and a first slit between an edge of the first hook and the first elliptical hole within the first hook, and a second slit between an edge of the second hook and the second elliptical hole within the second hook.

14 Claims, 9 Drawing Sheets

BACK LIGHT UNIT AND LIQUID CRYSTAL DISPLAY USING THE SAME

RELATED APPLICATIONS

This application claims the benefit of Korea Patent Application No. 10-2008-0094816 filed on Sep. 26, 2008, which is incorporated herein by reference for all purposes as if fully set forth herein.

BACKGROUND

1. Field of the Invention

The present disclosure relates to the backlight unit. Particularlyy, the present disclosure relates to the backlight unit for preventing the optical sheet from cracking and the liquid crystal display (or "LCD") using the backlight unit.

2. Discussion of the Related Art

Nowadays, due to the characteristics of light weight, slimness, low electic power consumption, the liquid crystal display device is being widely more and more applied. The liquid crystal display device is used in portable computers such as a notebook PC, official automation devices, audio/video devices and external/internal advertizing display devices. The transparent type liquid crystal display device, the type most commonly used, shows the picture data by modulating the luminescence of the light incident from the backlight unit by controlling the electric field applied to the liquid crystal layer.

As the LCD device is not a self-luminescence display device, it requires a light source such as s backlight Unit. There are two types for the backlight units for LCD devices; the direct type and the edge type. For the edge type, the light source is disposed around the flat panel and the light from the light source is guided to the front surface of the LCD panel using a transparent light guide. For the direct type, the light source is dispose on the rear surface of the LCD panel so that the light from the backlight source is directly radiated to the LCD panel. Compared with the edge type, the direct type can have a brighter luminescence by using more light sources. Further, the direct type has an advantage in making the light irradiating surface larger. Therefore, for the LCD TV requiring a large size LCD panel, the direct type is generally used.

The direct type backlight unit comprises a light source 10 irradiating light to the liquid crystal display panel, a bottom cover 20 housing the lighit source 10, a support side 30 supporting the light source 10 at both open sides of the bottom cover 20, and diffusion plate 40 and optical sheets 50 sequentially stacked on the light source 10.

The bottom cover 20 includes a bottom surface 20a, slant surfaces 20b at both sides of the bottom surface 20a, and upper sufaces 20c expanded from each slant suface 20b to stack the diffusion plate 40 and optical sheets 50 thereon. At the upper surfaces 20c of the bottom cover 20, a first protrusion 22 is formed for preventing the diffusion plate 40 and optical sheets 50 from moving freely. In the interim, on the upper surface 32 of the support side 30, a second protrusion 34 is formed for preventing the diffusion plate 40 and optical sheets 50 from moving freely.

The diffusion plate 40 diffuses the light incident from the light source 10 to the front direction of the liquid crystal display panel to make the distribution density of the light irradiating to the liquid crystal display device to be uniform. The diffusion plate 40 is guided by the first protrusion 22 and the second protrusion 34 so that it is fixed on the upper surface 20c of the bottom cover 20 and the upper surface 32 of the support side 30.

The optical sheets 50 make the transmitting angle of the light diffused by the diffusion plate 40 to be vertical to the liquid crystal display panel to increase the light transmitting efficiency. The optical sheets 50 include at least one diffusion sheet and prism sheet. The optical sheets 50 include a first hook 52 having a first elliptical hole 52a and a second hook 54 having a second elliptical hole 54a so that they are fixed on the upper surface 20c of the bottom cover 20 and the upper surface 32 of the support side 30. The first elliptical hole 52a formed at the first hook is engaged with the first protrusion 22 formed at the upper surface 20c of the bottom cover 20. The second elliptical hole 54a formed at the second hook 54 is engaged with the second protrusion 34 formed at the upper surface 32 of the support side 30. Here, the first and the second elliptical holes 52a and 54a make point contacts or contacts with narrow contact surface to the first and second protrusions 22 and 34, respectively.

During deliverying the liquid crystal display device havin the backlight unit, if an impact force (ST) is applied to the LCD device to the −y direction from outside, the impact force (ST) causes concentrated stress on the point (P1) where the line part (A1) of the first and second elliptical holes 52a and 54a meets to the curved part (A2), to the +y direction, as shown in FIG. 3a. Due to the concentrated stress, certain point (P1) of the optical sheets 50 may be cracked as shown in FIG. 3b. The first and second hooks 52 and 54 of the optical sheets 50 week to the impact force applied to the +y and/or −y directions. Sprcifically, the occurrence ratio of the crack problem is increased because the thickness (t) of the rib portion is thinner due to the restriction of the bezel width, and the the endplay is increasing at impact due to the large LCD device size.

In the currently manufactured LCD device, there is no structural element for absorbing the impact force concentrated to the hook of the sheel, when impact force is applied to the backlight unit from the outside. Furthermore, the liquid crystal display device having a backlight unit according to conventional art may have the second problem due to the impact force such that the sheet may be taken off, wrinkeled, or dented as well as the display quality may be degraded due to the intrusion of the foreign materials generated due to cracks in the sheet.

BRIEF SUMMARY

A backlight unit accoding to the embodiment of the present disclosure comprises: a light having a plurality of light source; a bottom cover housing the light and having a first protrusion; a support side engaging to both open ends of the bottom cover to support the light and having a second protrusion; an optical sheet disposing on the light and including a first hook having a first elliptical hole for inserting the first protrusion and a second hook having a second elliptical hole for inserting the second protusion; and a first slit between an edge of the first hook and the first elliptical hole within the first hook, and a second slit between an edge of the second hook and the second elliptical hole within the second hook.

A liquid crystal display device according to the embodiment of the present disclosure comprises: a backlight unit including a light having a plurality of light source; a bottom cover housing the light and having a first protrusion; a support side engaging to both open ends of the bottom cover to support the light and having a second protrusion; and an optical sheet disposing on the light and including a first hook having a first elliptical hole for inserting the first protrusion and a second hook having a second elliptical hole for inserting the second protusion; a liquid crystal display panel representing video image using light incident from the backlight unit; and a first slit between an edge of the first hook and the first elliptical hole within the first hook, and a second slit between an edge of the second hook and the second elliptical hole within the second hook.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Referring to FIG. 4 to 10b, the preferred embodiments of the present disclosure will be explained in detail.

Figure 1:
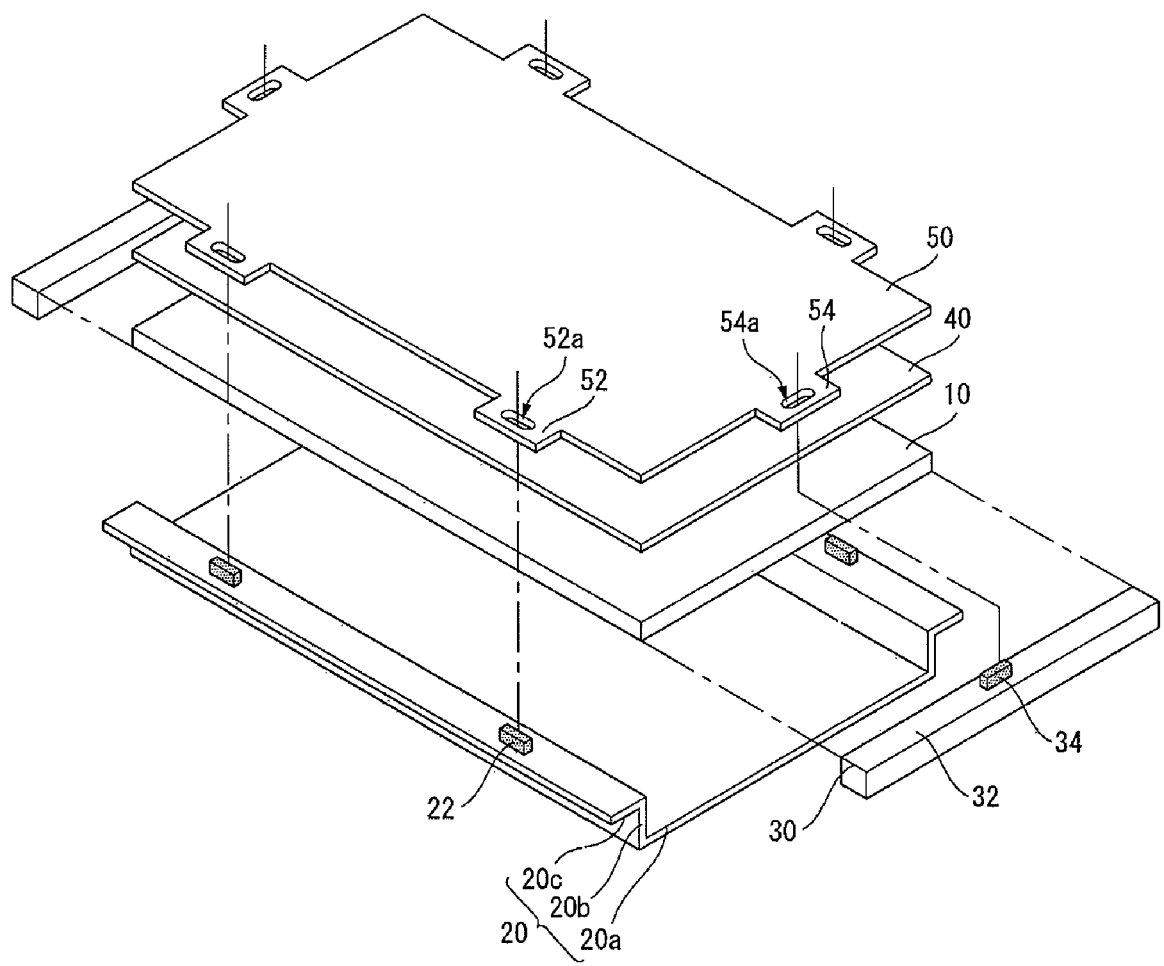
FIG. 1 is a disassembled perspective view illustrating the direct type backlight unit according to the related art.
Figure 2:
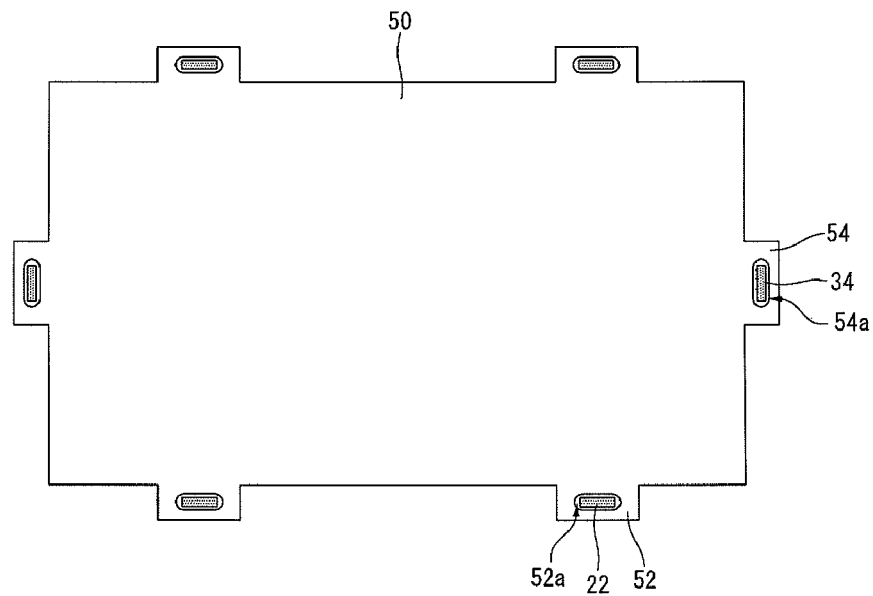
FIG. 2 is a diagram illustrating the optical sheets fixing on the upper surface of the bottom cover and the upper surface of the support side according to the related art.
Figure 3A:
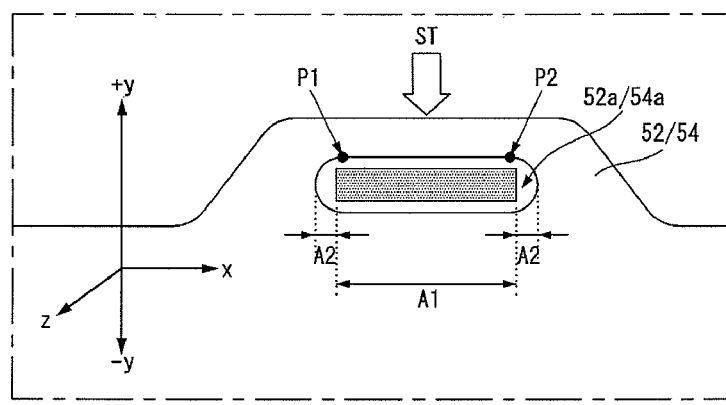
FIG. 3a is a diagram illustrating the concentrated stress on the optical sheet by the external impact force.
Figure 3B:
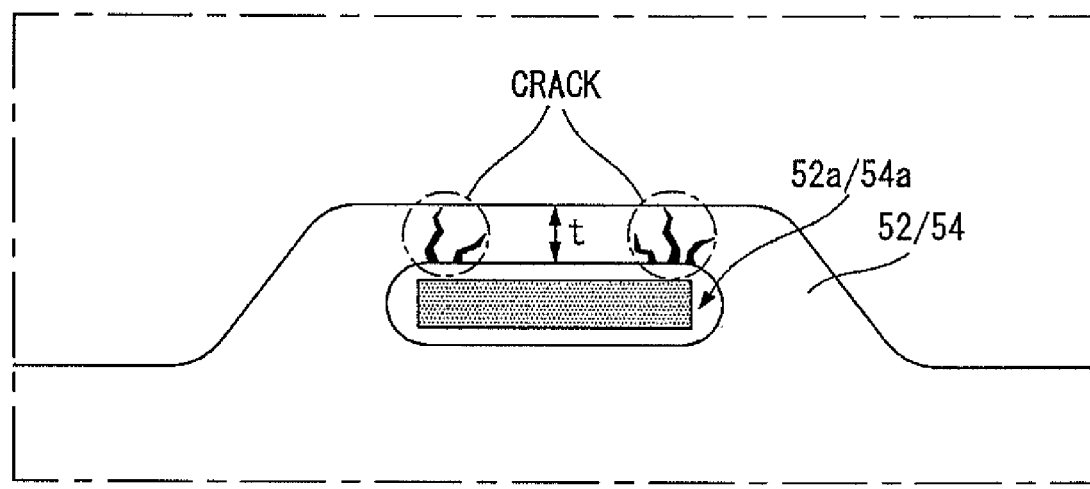
FIG. 3b is a diagram illustrating a portion of optical sheets which is cracked by the concentrated strees.
Figure 4:
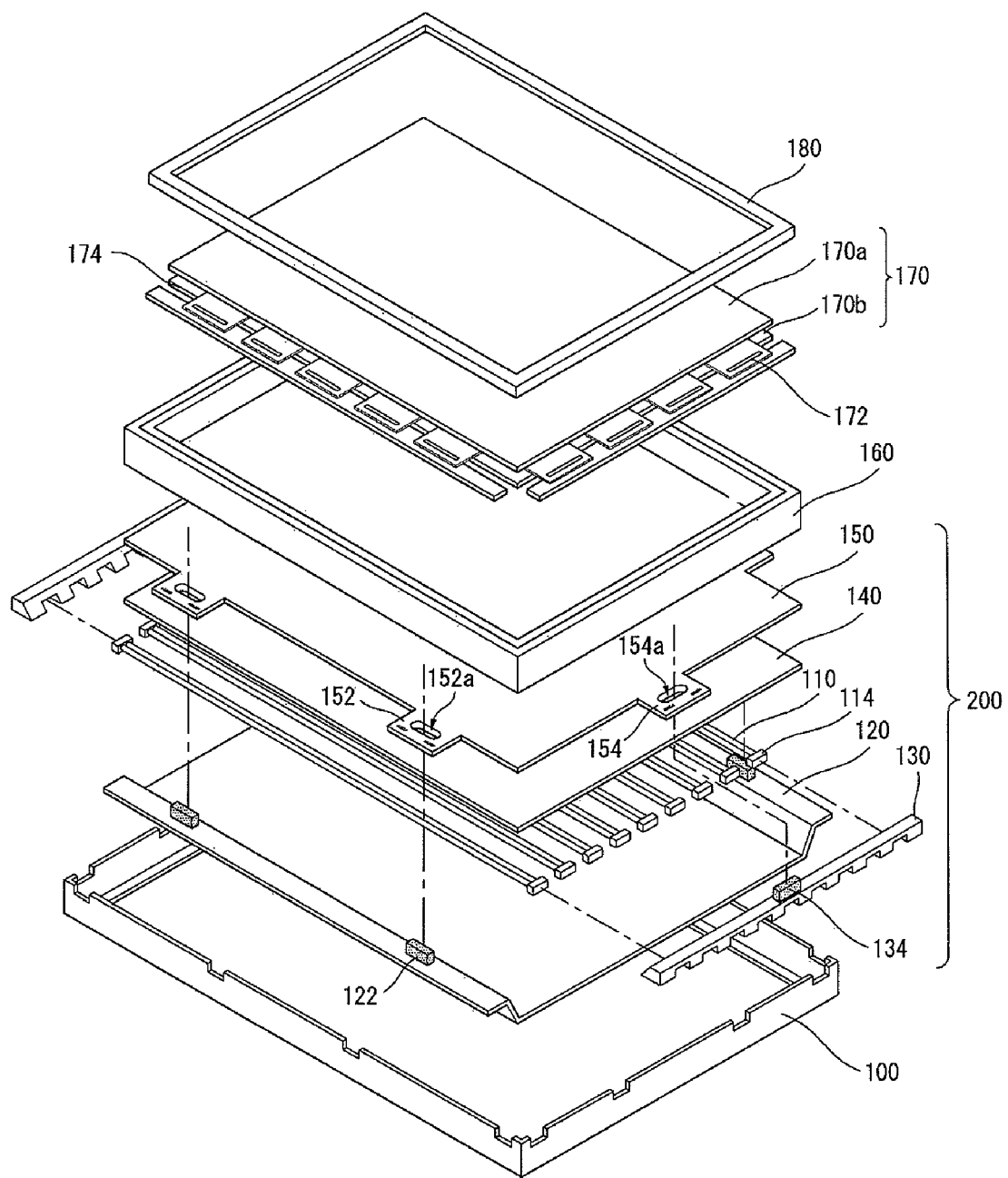
FIG. 4 is a disassembled perspective view illustrating a liquid crystal display device according to the embodiment of the present disclosure.
Figure 5:
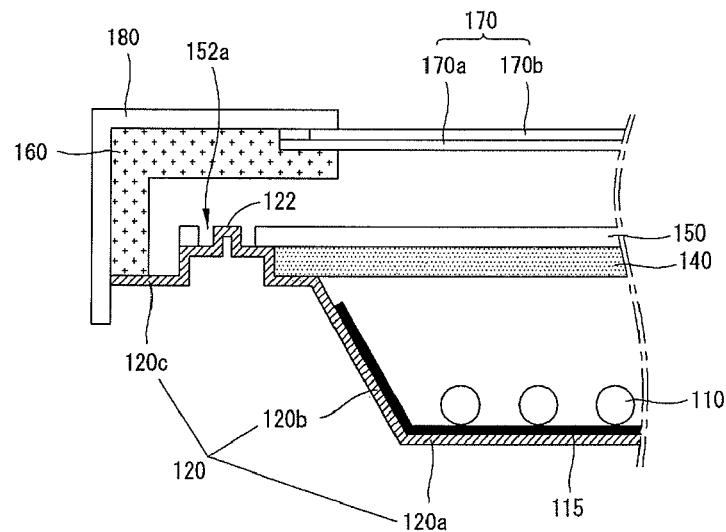
FIG. 5 is a one side cross-sectional view illustrating an assembly of the liquid crystal display device shown in FIG. 4.
Figure 6:
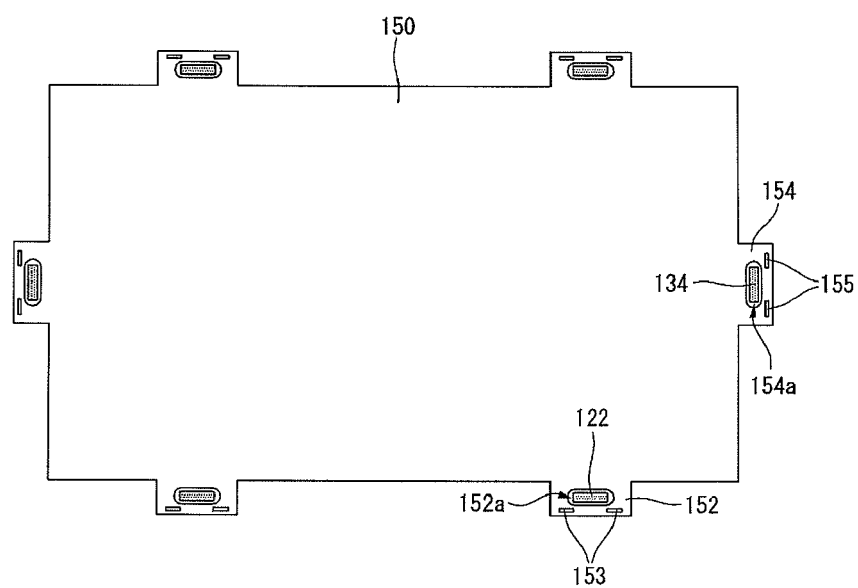
FIG. 6 is a diagram illustrating the optical sheets fixing on the upper surface of the bottom cover and the upper surface of the support side according to the embodiment of the present disclosure.

FIG. 4 is a disassembled perspective view of the liquid crystal display device according to the embodiment of the present disclosure. FIG. 5 is a cross-sectional view illustrating one side of the assembled liquid crystal display device shown in FIG. 4. In addition, FIG. 6 is a diagram illustrating the optical sheets fixing on the upper surface of the bottom cover and the upper surface of the support side.

Referring to FIG. 4 and FIG. 5, the liquid crystal display device according to the present disclosure comprises a support main 100, a backlight unit 200 and a liquid crystal display (or "LCD") panel 170 stacked inside of the support main 100, a panel guide 160 supporting the LCD panel 170 by stacking to the support main 100, and a top case 180 housing the edge of the LCD panel 170 and the vertical surface of the support main 100.

The top case 180 is made in a rectangular frame having a horizontal surface and a vertical surface vertically bented each other. The top case 180 wraps around the edge portions of the LCD panel 170 and the panel guide 160.

The support main 100, as a molded object, has a stepped extrusion at the inner wall. The backlight unit 200 and the LCD panel 170 are stacked on the stepped inner wall.

The liquid crystal display panel 170 includes a color filter array substrate 70a and a thin film transistor array substrate 170b. The liquid crystal cells are arrayed in active matrix type between the color filter array substrate 170a and the thin film transistor array substrate 170b. The thin film transistor (or "TFT") is installed at each liquid crystal cell for switching the video signal. The light transition ratio of each liquid crystal cell is varied according to the video signal so that the video image according to the video signal is shown on the liquid crystal panel 170. On the TFT array substrate 170b, a gate tape carrier package 172 mounting the gate IC generating the gate signal and a data tape carrier package 174 mounting the data IC generating the data signal are attached.

The panel guide 160 includes a rectangular frame surrounding the vertical surface of the LCD panel 170 and a saddle portion for sitting the LCD panel 170 thereon, which is extended in a predetermined length from the inside wall of the rectangular frame. The panel guide 160 is stacked on the support main 100 so that it supports the LCD panel 170.

The backlight unit 200 includes a plurality of lamp 110 irradiating light to the LCD panel 170, a plurality of lamp holder 114 connecting to each ends of the lamps 110, a bottom cover 120 disposed at the rear surface of the lamps 110 for housing the lamps 110 and the lamp holders 114, a support side 130 installed at both open ends of the bottom cover 120 for supporting the lamps 110, a diffusion plate 140 disposed over the lamps 110, and optical sheets 150 located over the diffusion plate 140.

For lamps 110, any one of the cold cathode fluorescent lamp (or "CCFL") and the external electrode fluorescent lamp (or "EEFL") can be used. Each of the lamps 110 includes a glass tube, an inertia gas filled in the glass tube, and cathode and anode electrodes installed at each ends of the glass tube, respectively. The inertia gas is filled in the glass tube and the fluorescent material is coated on the inner surface of the glass tube. The lamps 110 is fixed by the lamp guides (not shown) and disposed over the bottom cover 120. In the interim, an LED (or "Light Emitting Diode") array or the hybrid arry having LEDs and lamps can be used for the backlight. A plurality of lamp holder 114 connects to the each edges of the lamps 110 so as to hold the lamps 110 and to support the lamps 110.

The diffusion plate 140 diffuses the light incident from the lamps 110 to the front side of the LCD panel so that the light distribution density can be uniformed. The diffusion plate 140 is guided by the first and the second protrusions 122 and 134 and disposed on the upper surface 120c of the bottom cover 120 and the upper surface 132 of the support side 130. The diffusion plate 140 is made of PMMA (or "polymethylmethacrylate") or glass for preventing deformation by the heat from the lamps 110.

Figure 7:
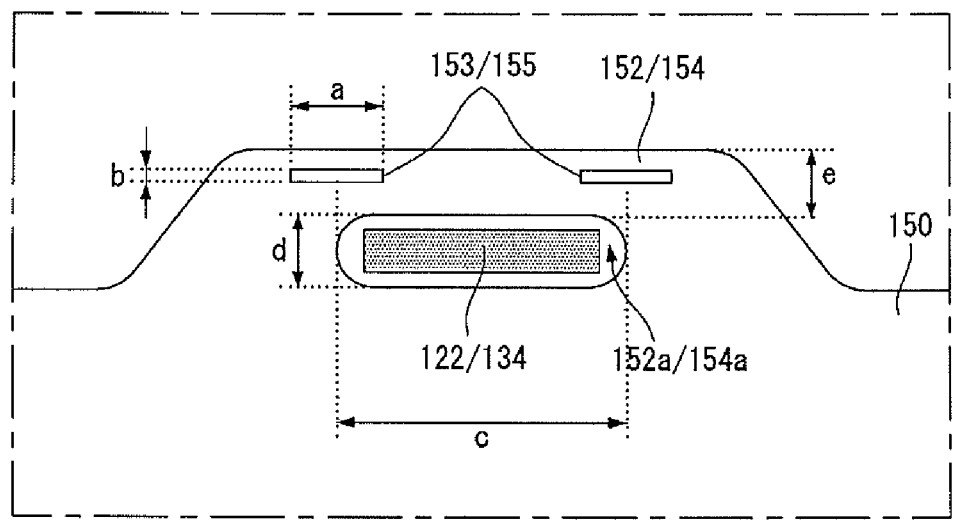
FIG. 7 is a diagram illustrating the disposing position and size of the slits according to the embodiment of the present disclosure.

The optical sheets 150 make the direction of the light diffused by the diffusion plate 140 to be vertical to the LCD panel so that the light incident effect can be improved. The optical sheets 150 include at least one diffusion sheet and a prism sheet. More preferably, the optical sheets 150 include 2 diffusion sheets and 2 prism sheets. For fixing on the upper surface 120c of the bottom cover 120 and the upper surface 132 of the support side 130, the optical sheets 150 includes a first hook 152 having a first elliptical hole 152a and a second hook 154 having a second elliptical hole 154a. The first hook 152 is formed around the long side of the optical sheets and the second hook 154 is formed around the short side of the optical sheets. As shown in FIG. 6, between the edge of the first hook 152 and the first elliptical hole 152a, a plurality of first slits 153 are provided for absorbing the external impact force. Furthermore, between the edge of the second hook 154 and the second elliptical hole 154a, a plurality of second slits 155 are provided for absorbing the external impact force. The first slit 153 is formed with having rectangular shape between the first elliptical hole 152a and the first hook. Each of the first slits 153 is formed around where the linear part and the curved part of the first elliptical hole 152a are met. The second slit 155 is formed with having rectangular shape between the second elliptical hole 154a and the second hook 154. Each of the second slits 155 is formed around where the linear part and the curved part of the second elliptical hole 154a are met. As shown in FIG. 7, the long side width (a) and the short side width (b) of the slits 153 and 155, and the long side width (c) and the short side width (d) of the elliptical holes 152a and 154a may be properly varied according to the rib portion width (e) which is the portion between the edge of the hook and elliptical hole, the size of the LCD panel or the model of the LCD panel. For example, the long side width (a) of the slits 153 and 155 may be selected one value within about 24%~40% of the long side width (c) of the elliptical holes 152a and 154a. Furthermore, the short side width (b) of the slits 153 and 155 may be selected one value within about 5%~7% of the short side width (d) of the elliptical holes 152a and 154a. As the narrower of the rib portion width (e) the weaker of hook to the external impact force, the long side width (a) and the short side width (b) of the slits 153 and 155 may be increasd or decreased reversely proportional to the rib portion width (e) within the above mentioned ranges. For example, if the long side width (c) of the elliptical hole is about 15~25 mm, the short sid width (d) of the elliptical hole is 3 mm and the rib portion width (e) is 4 mm, the long side width (a) and the short side width (b) of the slits are about 6 mm and about 0.2 mm, respectively.

Figure 8A:
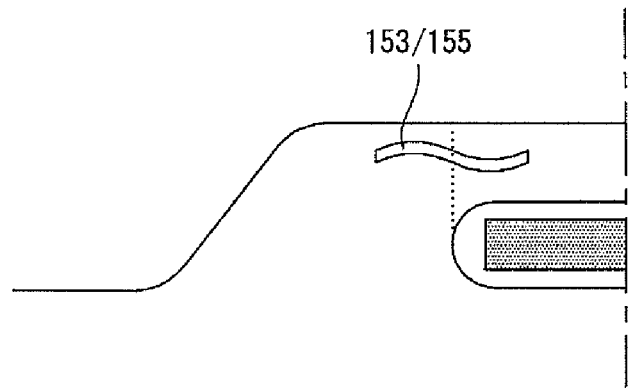
FIGS. 8a to 8c are diagrams illustrating the shapes and/or structures of another embodiment of the present disclosure.
Figure 8B:
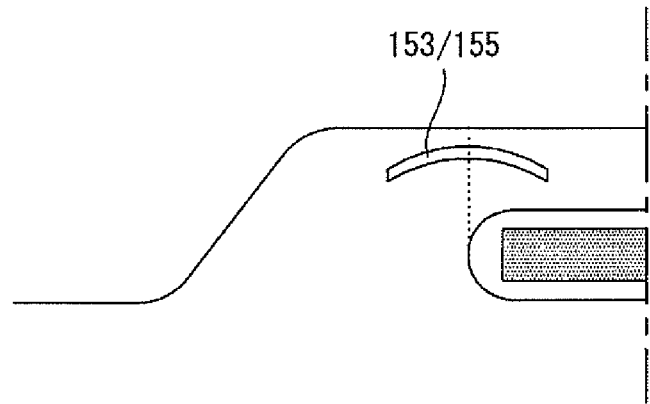
Figure 8C:
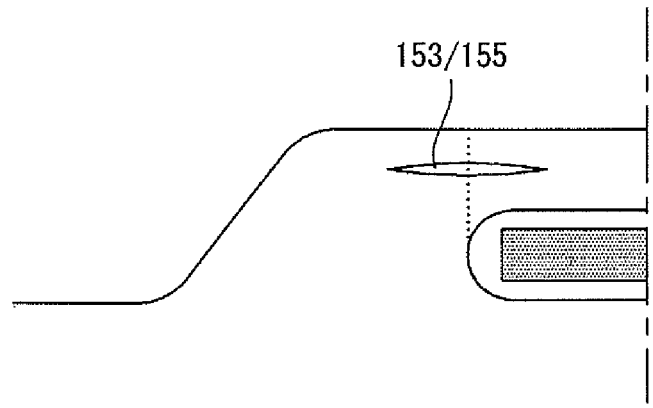

In addition, besides the rectangular shape as shown in FIG. 7, the slits 153 and 155 formed at the hooks 152 and 154 may have the wave shape bending twice in reverse direction as shown in FIG. 8a, the half-moon shape bending once as shown in FIG. 8b, or the convex lens shape (or elliptic shape) having different width partially as shown in FIG. 8c.

Figure 10A:
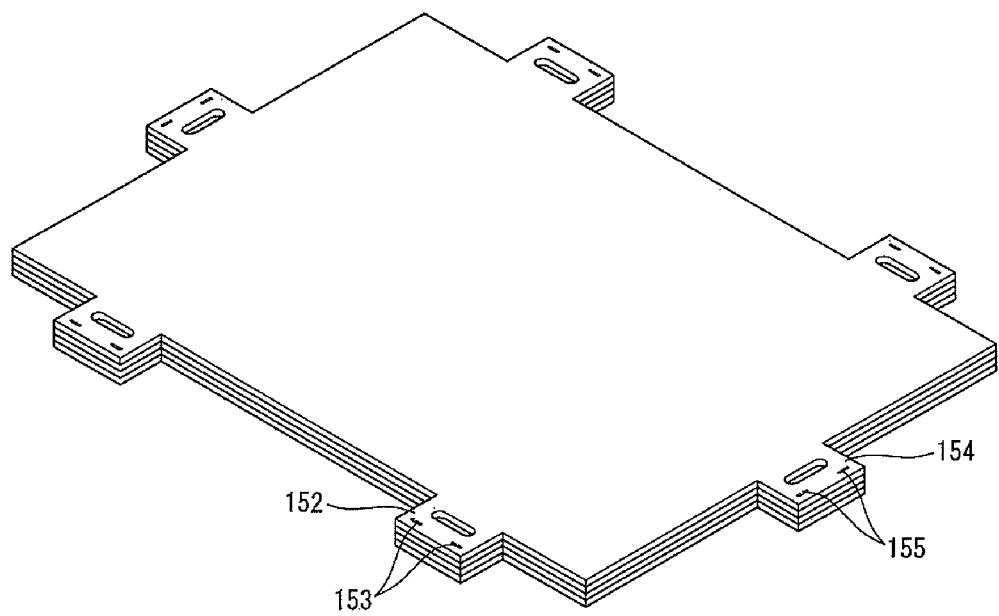
FIG. 10a is a diagram illustrating the first and the second hooks according to one embodiment of the present disclosure.
Figure 10B:
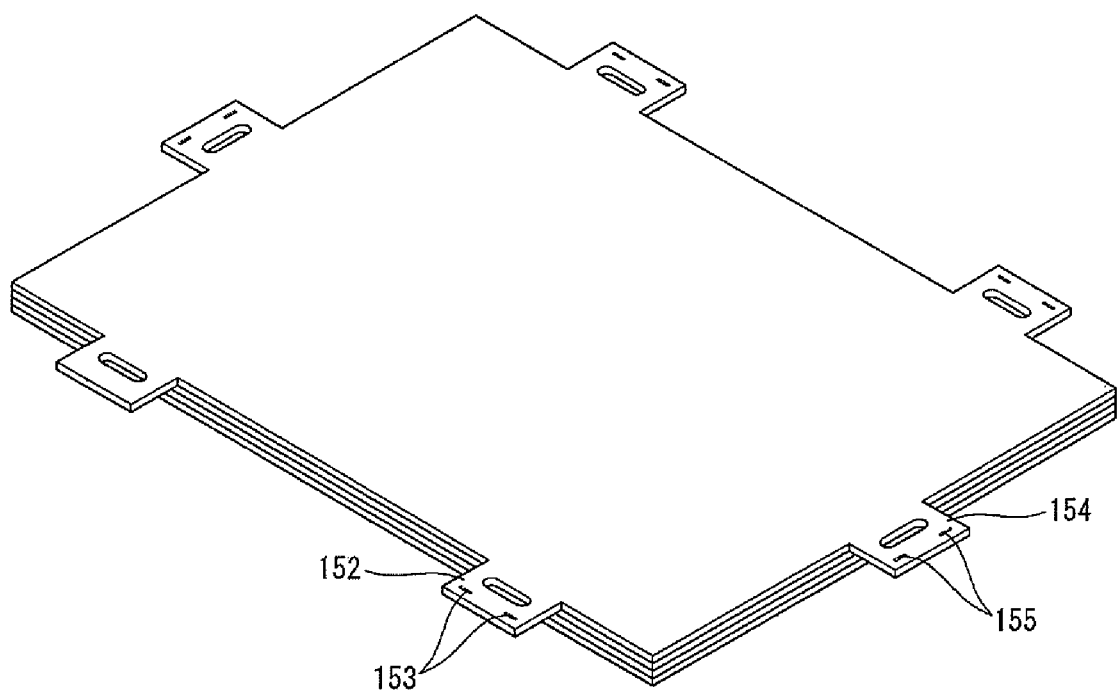
FIG. 10b is a diagram illustrating the first and the second hooks according to another embodiment of the present disclosure.

The first elliptic hole 152a formed at the first hook 152 is engaged with the first protrusion 122 formed on the upper surface 120c of the bottom cover 120. The second elliptic hole 154a formed at the second hook 154 is engaged with the second protrusion 134 formed on the upper surface 132 of the support side 130. The optical sheets 150 may be made of PET (or "Polyethylene Terephthalate"). In the interim, the first hook 152 and the second hook 154 may be formed at all optical sheets 150 as shown in FIG. 10a. Otherwise, the first and second hooks 152 and 154 may be formed at the upper most optical sheet only as shown in FIG. 10b. For the case that the first hook 152 and the second hook 154 are formed at all optical sheets 150 as shown in FIG. 10a, the optical sheets 150 can be fixed firmly, but the fabricating and the assembling processes for the optical sheets may be complicated. For the case that the first and second hooks 152 and 154 may be formed at the upper most optical sheet only as shown in FIG. 10b, the fabricating and the assembling processes for the optical sheets can be simplified, but the optical sheets 150 can not be held firmly.

The bottom cover 120 is disposed at the rear side of the lamps 110 for housing and supporting the lamps 110 and the lamp holders 114. The bottom cover 120 includes a bottom surface 120a, slant surfaces 120b slantly extended from two opposite sides of the bottom surface 120a, and upper surface 120c expanded from the slant surfaces 120b to mount the diffusion plate 140 and optical sheets 150 thereon. The slant surface 120b and upper surface 120c are formed at the two long sides of the bottom cover 120. The both short sides of the bottom cover 120 are opened. On the upper surface 120c of the bottom cover 120, the first protrusion 122 is formed for preventing the diffusion plate 140 and the optical sheets 150 from endplaying freely. The first protrusion 122 has any one shape of cylindrical shape, triangular column shape, rectangular column shape or polygon column shape. On the bottom surface 120a and slant surface 120b of the bottom cover 120, a reflection sheet 115 is attached. The reflection sheet 115 is made of the matrial reflecting the light and is attached to the bottom surface 120a and slant surface 120b of the bottom cover 120 with the double side adhesive tape. The reflection sheet 115 reflects the light irradiating from the lamps 110 to the bottom cover 120 to the LCD panel 170 so that the light efficiency of the backlight is improved.

The support side 130 engaed into both short sides of the bottom cover 120 includes the upper surface 132 and the pimple portion where the lamp holders 114 are inserted into. On the upper surface 132 of the support side 130, the second protrusion 134 is formed for preventing the diffusion plate 140 and the optical sheets 150 from endplaying freely. The second protrusion 134 has any one shape of cylindrical shape, triangular column shape, rectangular column shape or polygon column shape. The support side 130 supports lamps 110, diffusion plate 140, and optical sheets 150.

Figure 9:
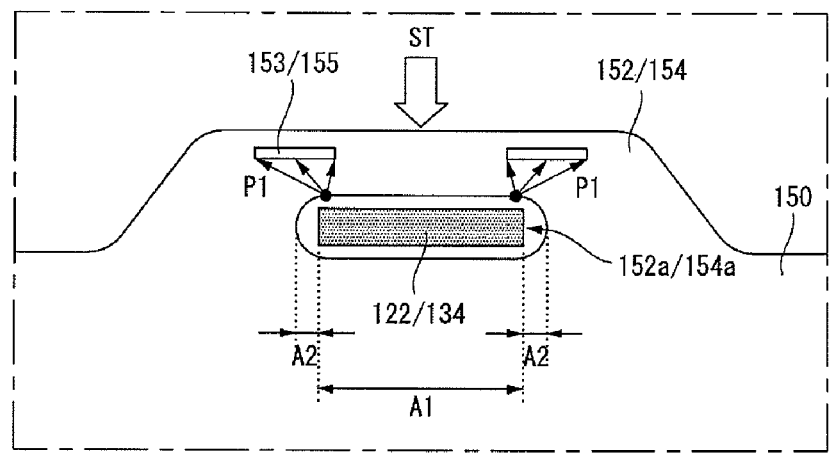
FIG. 9 is a diagram illustrating the slits abosorbing and/or dispersing the external impact force to prevent the optical sheets from being cracked, according to the embodiments of the present disclosure.

FIG. 9 illustrates that the external impact force is absorbed or dispersed by the slits so that the crak is prevented.

Referring to FIG. 9, the slits 153 and 155 formed between the elliptical holes 152a and 154a and the edge of the hooks 152 and 154 absorb the impact force (ST) from outside or block the transmission of the impact force to the optical sheet so as to relief the stress concentrated on the point P1 where the linear part A1 and curved part A2 of the elliptical holes 152a and 154a are met. Therefore, even if any external impact force is applied, the sheet is not cracked due to the impact force. Even more, if a crack is caused around the point P1 where the linear part A1 and curved part A2 of the elliptical holes 152a and 154a are met, when the external impact force is too large, the slits 153 and 155 block the progess of the crack. As a result, the latency causes of the defects such as the taking off the sheet, the wrinkle of the sheet, the dentation of sheet and so on can be prevented. Furthermore, the amount of the foreign material due to the crack can be reduced remarkably so that the degradation of the video quality can be prevented.

As mentioned above, the backlight unit according to the present disclosure and the liquid crystal display devive using the backlight unit include hook having elliptical holes for fixing the optical sheets, and the slits between the edge of the hook and the elliptical hole for absorbing the impact force. Therefore, the crack problem due to the external impact force during deliverying can be remarkably reduced.

While the embodiment of the present invention has been described in detail with reference to the drawings, it will be understood by those skilled in the art that the invention can be implemented in other specific forms without changing the technical spirit or essential features of the invention. The scope of the invention is defined by the appended claims rather than the detailed description of the invention. All changes or modifications or their equivalents made within the meanings and scope of the claims should be construed as falling within the scope of the invention.

The invention claimed is:

1. A backlight unit comprising:
   a light having a plurality of light source;
   a bottom cover housing the light and having a first protrusion;
   a support side engaging to both open ends of the bottom cover to support the light and having a second protrusion;
   an optical sheet disposing on the light and including a first hook having a first elliptical hole for inserting the first protrusion and a second hook having a second elliptical hole for inserting the second protusion; and
   a first slit between an edge of the first hook and the first elliptical hole within the first hook, and a second slit between an edge of the second hook and the second elliptical hole within the second hook,
   wherein the first slit is disposed around two points where a linear part and a curved part of the first elliptical hole are met; and
   the second slit is disposed around two points where a linear part and a curved part of the second elliptical hole are met.

2. The backlight unit of the claim 1, wherein the first slit includes a long side width and a short side width of the first slit decided by the size of the first elliptical hole, and decided by a width of a first rib portion, wherein the width of the first rib portion is defined by a width between the edge of the first hook and the first elliptical hole; and
   the second slit includes a long side width and a short side width of the second slit decided by the size of the second elliptical hole, and decided by a width of a second rib portion, wherein the width of a second rib portion is defined by a width between the edge of the second hook and the second elliptical hole.

3. The backlight unit of the claim 1, wherein the long side width of the first slit is decided within range of 24%~40% of the long side width of the first elliptical hole, and the short side width of the first slit is decided within range of 5%~7% of the short side width of the first elliptical hole; and
   the long side width of the second slit is decided within range of 24%~40% of the long side width of the second elliptical hole, and the short side width of the second slit is decided within range of 5%~7% of the short side width of the second elliptical hole.

4. The backlight unit of the claim 1, wherein the long side width and the short side width of the first slit is increased and/or decreased reversely proportional to the width of the first rib portion within the ranges of 24%~40% and 5%~7%, respectively; and
   the long side width and the short side width of the second slit is increased and/or decreased reversely proportional to the width of the second rib portion within the ranges of 24%~40% and 5%~7%, respectively.

5. The backlight unit of the claim 1, wherein the first and the second slits have any one shape of a rectangular shape, a wave shape, a half-moon shape, and convex lens shape.

6. The backlight unit of the claim 1, wherein the optical sheet includes at least one diffusion sheet and at least one prism sheet, and the first hook and the second hook are formed at all of the diffusion sheet and the prism sheet.

7. The backlight unit of the claim 1, wherein the optical sheet includes at least one diffusion sheet and at least one prism sheet, and the first hook and the second hook are formed at uppermost sheet.

8. A liquid crystal display device comprising:
   a backlight unit including a light having a plurality of light source; a bottom cover housing the light and having a first protrusion; a support side engaging to both open ends of the bottom cover to support the light and having a second protrusion; and an optical sheet disposing on the light and including a first hook having a first elliptical hole for inserting the first protrusion and a second hook having a second elliptical hole for inserting the second protusion;
   a liquid crystal display panel representing video image using light incident from the backlight unit; and
   a first slit between an edge of the first hook and the first elliptical hole within the first hook, and a second slit between an edge of the second hook and the second elliptical hole within the second hook,
   wherein the first slit is disposed around two points where a linear part and a curved part of the first elliptical hole are met; and
   the second slit is disposed around two points where a linear part and a curved part of the second elliptical hole are met.

9. The device of the claim 8, wherein the first slit includes a long side width and a short side width of the first slit decided by the size of the first elliptical hole, and decided by a width of a first rib portion, wherein the width of the first rib portion is defined by a width between the edge of the first hook and the first elliptical hole; and
   the second slit includes a long side width and a short side width of the second slit decided by the size of the second elliptical hole, and decided by a width of a second rib portion, wherein the width of a second rib portion is defined by a width between the edge of the second hook and the second elliptical hole.

10. The device of the claim 8, wherein the long side width of the first slit is decided within range of 24%~40% of the long side width of the first elliptical hole, and the short side width of the first slit is decided within range of 5%~7% of the short side width of the first elliptical hole; and
    the long side width of the second slit is decided within range of 24%~40% of the long side width of the second elliptical hole, and the short side width of the second slit is decided within range of 5%~7% of the short side width of the second elliptical hole.

11. The device of the claim 10, wherein the long side width and the short side width of the first slit is increased and/or decreased reversely proportional to the width of the first rib portion within the ranges of 24%~40% and 5%~7%, respectively; and
    the long side width and the short side width of the second slit is increased and/or decreased reversely proportional to the width of the second rib portion within the ranges of 24%~40% and 5%~7%, respectively.

12. The device of the claim 8, wherein the first and the second slits have any one shape of a rectangular shape, a wave shape, a half-moon shape, and convex lens shape.

13. The device of the claim 8, wherein the optical sheet includes at least one diffusion sheet and at least one prism sheet, and the first hook and the second hook are formed at all of the diffusion sheet and the prism sheet.

14. The device of the claim 8, wherein the optical sheet includes at least one diffusion sheet and at least one prism sheet, and the first hook and the second hook are formed at uppermost sheet.

* * * * *